US012662214B2

(12) United States Patent
Garcia et al.

(10) Patent No.: US 12,662,214 B2
(45) Date of Patent: Jun. 23, 2026

(54) POWER SHIFT TRANSMISSION, METHOD OF OPERATING THE SAME AND BICYCLE HAVING A POWER SHIFT TRANSMISSION

(71) Applicant: MAHLE International GmbH, Stuttgart (DE)

(72) Inventors: Adrian Garcia, Ismaning (DE); Christian Wirth, Mossinning (DE)

(73) Assignee: Mahle International GmbH (DE)

( * ) Notice: Subject to any disclaimer, the term of this patent is extended or adjusted under 35 U.S.C. 154(b) by 511 days.

(21) Appl. No.: 18/134,563

(22) Filed: Apr. 13, 2023

(65) Prior Publication Data

US 2023/0331342 A1     Oct. 19, 2023

(30) Foreign Application Priority Data

Apr. 14, 2022    (DE) ..................... 10 2022 203 790.1

(51) Int. Cl.
| | |
|---|---|
| *B62M 6/55* | (2010.01) |
| *B62M 11/18* | (2006.01) |
| *F16D 41/24* | (2006.01) |

(52) U.S. Cl.
CPC .............. *B62M 6/55* (2013.01); *B62M 11/18* (2013.01); *F16D 41/24* (2013.01)

(58) Field of Classification Search
CPC ........... B62M 6/55; B62M 11/18; F16D 41/24
See application file for complete search history.

(56) References Cited

U.S. PATENT DOCUMENTS

| | | | |
|---|---|---|---|
| 11,247,749 B2 * | 2/2022 | Hinterkausen | ....... B62M 11/145 |
| 2019/0011037 A1 | 1/2019 | Iwai | |
| 2020/0086949 A1 | 3/2020 | Kaltenbach | |
| 2021/0207689 A1 | 7/2021 | Ziemer | |

FOREIGN PATENT DOCUMENTS

| | | | |
|---|---|---|---|
| DE | 102016216557 B3 | 12/2017 | |
| DE | 102016214694 A1 | 2/2018 | |
| DE | 102016225159 A1 | 6/2018 | |
| DE | 102017216502 A1 | 1/2019 | |
| DE | 102017122294 A1 | 3/2019 | |
| DE | 102017125068 A1 | 5/2019 | |
| DE | 102018212433 A1 | 1/2020 | |
| DE | 102018212435 A1 | 1/2020 | |
| DE | 102019220044 A1 | 6/2021 | |
| DE | 102020206299 A1 | 11/2021 | |
| EP | 2924319 A1 | 9/2015 | |
| EP | 3599154 B1 * | 3/2021 | .......... B62M 11/145 |

(Continued)

OTHER PUBLICATIONS

English abstract for DE-102017216502.

(Continued)

*Primary Examiner* — Faye M Fleming

(74) *Attorney, Agent, or Firm* — Fishman Stewart PLLC

(57) ABSTRACT

A power shift transmission for a vehicle driveable by motor power and/or pedal power may include a transmission device which transmits a torque introducible on a drive in a transmission ratio settable via a plurality of gears to an output. The power shift transmission may also include two shifting devices via which the transmission device is shiftable for setting the transmission ratio of the transmission device.

20 Claims, 4 Drawing Sheets

(56) References Cited

FOREIGN PATENT DOCUMENTS

| WO | 2012156613 A1 | 11/2012 | | |
| WO | WO-2018108487 A1 * | 6/2018 | .............. | F16H 3/44 |

OTHER PUBLICATIONS

English abstract for DE-102018212433.
English abstract for DE-102018212435.
English abstract for DE-102017122294.
English abstract for DE-102017125068.
English abstract for DE-102019220044.
English abstract for DE-102020206299.
English abstract for DE-102016225159.
English abstract for EP-2924319.
English abstract for DE-102016214694.
German Search Report for DE-102022203790.1.
Great Britain Combined search and examination report dated Sep. 27, 2023, GB2304411.8.

* cited by examiner

POWER SHIFT TRANSMISSION, METHOD OF OPERATING THE SAME AND BICYCLE HAVING A POWER SHIFT TRANSMISSION

CROSS-REFERENCE TO RELATED APPLICATIONS

This application claims priority to German Patent Application No. DE 10 2022 203 790.1, filed on Apr. 14, 2022, the contents of which is hereby incorporated by reference in its entirety.

TECHNICAL FIELD

The invention relates to a power shift transmission. Furthermore, the invention relates in particular to a method for operating the same and to a vehicle equipped with a power shift transmission.

BACKGROUND

Power shift transmissions of this type are known for example from DE 10 2016 216 557 C5. Disadvantageous in the said power shift transmission is that they are embodied relatively large and heavy, although compact and light power shift transmissions are desired.

SUMMARY

The object of the invention consists in stating a power shift transmission that is improved compared with the known prior art or at least another embodiment of a power shift transmission. The object of the invention, further, consists in proposing a method for operating such a power shift transmission and/or a bicycle having such a power shift transmission.

With the present invention, this object is achieved in particular through the subject matter of the independent claim(s). Advantageous embodiments are the subject matter of the dependent claim(s) and of the description.

The invention is based on the general idea of stating a power shift transmission that can be both upshifted and also downshifted having a relatively low number of shifting devices for shifting the same.

For this purpose, a power shift transmission according to the invention is provided for a vehicle that can be driven by motor power and/or pedal power, in particular a bicycle, further in particular a conventional bicycle purely operated by muscle power or an electric bicycle such as an E-bike or a Pedelec, which comprises a transmission device that transmits a torque, introduced or introducible on a drive of the power shift transmission in a transmission ratio that is settable by gears, to an output of the power shift transmission. It is substantial that the power shift transmission has exactly two or more than two separate controllable and/or regulatable shifting devices, by means of which, for setting the said transmission ratio of the transmission device, the transmission device is shiftable. For shifting the transmission device a first shifting device of the said shifting devices interacts directly and another second shifting device of the said shifting devices indirectly via a clutch of the power shift transmission with the transmission device. Because of this, the transmission ratio of a torque introduced on the drive side that can be provided by the power shift transmission can be set with merely two shifting devices, so that compared with the known power shift transmissions the power shift transmission according to the invention is a relatively compact and light-weight construction. The said clutch makes possible in particular realising a transmission ratio preselection in the manner that the transmission device, beside a provided actually load-bearing transmission ratio, pre-shifts or provides at least one preselected load-free transmission ratio. The result is that, in particular when the power shift transmission according to the invention is installed in the region of a pedal crank of a bicycle, for example a conventional bicycle operated purely by muscle power or an electric bicycle such as an E-bike or Pedelec, this has advantages for the power to weight ratio and for the realisable design of the bicycle in the region of the pedal crank.

Practically it is provided that the transmission device comprises at least two or exactly two shiftable planetary gear sets that are coupled to one another via a load freewheel for achieving a transmission ratio that can be provided by the transmission device. The planetary gear sets can be arranged coaxially to one another. The said load freewheel, like any other freewheel of the invention described in the following, is practically a direction of rotation-dependent clutch. Accordingly, a torque can be transmitted from the one planetary gear set via the said load freewheel to the other planetary gear set.

Thus it can be provided in particular that the said load freewheel each couples a sun gear of the one planetary gear set to a sun gear of the other planetary gear set. Thus, the sun gears of the said planetary gear sets coupled by way of the load freewheel can rotate in a specified direction of rotation (coupling direction of rotation), in particular about a centre longitudinal axis described in the following, with identical rotational speeds, wherein the load freewheel blocks. Practically, the load freewheel remains open in the case of opposite directions of rotation of the sun gears.

Further practically it is provided that the two said shifting devices are equipped to interact with the planetary gear sets so that by means of the transmission device different transmission ratios can be provided. This is practically realised in that the one first shifting device of the two said shifting devices directly shifts a shiftable planetary gear set of the said planetary gear sets arranged in particular on the drive side or is at least equipped to do so. The other second shifting device of the two said shifting devices accomplishes this in that it shifts a shiftable planetary gear set of the said planetary gear sets arranged in particular on the drive side and/or another shiftable planetary gear set of the said planetary gear sets arranged in particular on the output side indirectly via the said clutch or is equipped to do so. In other words, the one first shifting device interacts with a planetary gear set in order to shift the same while the other second shifting device interacts with a further planetary gear set in order to shift the same. Because of this, a shift of the planetary gear sets can be realised by means of the two shifting devices as a result of which by means of the transmission device a desired transmission ratio can be provided. The expression "shifting a planetary gear set" can mean that a transmission ratio of the planetary gear set is changed.

Practically it is provided that the said drive comprises a drive shaft in particular a hollow drive shaft defining in its main extension direction a centre longitudinal axis, for introducing the torque on the drive side or is formed by the same. Practically, the output or a hollow output shaft forming the same is mounted on the drive shaft so as to be rotatably adjustable. Needle bearings are particularly suited for realising the said rotary mounting. Furthermore, it can be provided that the said planetary gear sets of the transmission device are arranged axially with respect to the centre longitudinal axis in series and/or each coaxially with respect to the centre longitudinal axis. The planetary gear sets can be mounted so as to be rotatably adjustable on the drive shaft and/or the hollow output shaft. Needle bearings can also be suitable for realising this rotary mounting. By way of this arrangement it is altogether possible to equip a power shift transmission with planetary gear sets, wherein it is a relatively compact construction both axially with respect to the centre longitudinal axis and also transversely thereto.

On the drive shaft, in particular on the free shaft ends of the same, pedals can be mounted in the known manner, via which the torque generated by muscle power can be introduced into the drive shaft.

The said hollow output shaft forming the output, on which a torque provided in a transmission ratio preset by the transmission device can be taken off, can enclose the drive shaft coaxially with respect to the centre longitudinal axis. The said hollow output shaft can laterally protrude over a transmission housing of the power shift transmission encapsulating at least the transmission device and the shifting devices in the direction of the centre longitudinal axis, so that an axial protrusion is formed. The axial protrusion can be prepared for receiving an attachment part in practice referred to in particular as spider. The attachment part can be mounted on the axial protrusion, alternatively the axial protrusion can integrally form the attachment part. On the attachment part, for example a chain ring for a drive chain can be mounted so that a torque introduced into the drive on the drive side is conducted via the transmission device in a specified transmission ratio to the output and can be taken off by way of the attachment part or the chain ring mounted thereon.

Further practically it is provided that a drive-side planetary gear set of the said planetary gear sets coupled to the drive shaft is formed by, or comprises:

A so-called simple planetary gear consisting of a central sun gear, a planet gear stage and a ring gear, wherein practically the sun gear is coupled to the drive shaft so as to be rotatably adjustable or non-rotatable, or a so-called reduced planetary gear consisting of two adjacent central sun gears, a planet gear stage and a ring gear, wherein practically the one sun gear and/or also the other sun gear is coupled to the drive shaft so as to be rotatably adjustable or non-rotatable. Each of the mentioned ring gears can be assigned a freewheel via which the ring gear supports itself on the drive shaft. The said planet gear stage can practically comprise multiple planet gears and a carrier for receiving the planet gears. Because of this, the drive-side planetary gear set can be realised relatively cost-effectively. Obviously, the invention is to also cover further planetary gears besides the planetary gear types referred to herein.

The said coupling of the drive shaft to the drive-side planetary gear set of the said planetary gear sets can be realised with interconnection of a hollow intermediate shaft of the power shift transmission that is coupled or coupleable to an electric motor. The drive shaft can be coupled to the hollow intermediate shaft via a freewheel. The drive-side planetary gear set can be coupled, in particular with its sun gear or one of its sun gears, via a freewheel to the hollow intermediate shaft. Furthermore, the hollow intermediate shaft can be configured in such a manner that it coaxially encloses the drive shaft with respect to its centre longitudinal axis, extends axially in the direction of the centre longitudinal axis at least in sections over the drive shaft and is mounted so as to be rotatably adjustable about the same, and in particular on the same. A needle bearing is particularly suited for realising the said rotary mounting. On a portion facing with respect to the drive-side planetary gear set, the hollow intermediate shaft can comprise in particular on an outer circumferential side oriented away from the drive shaft a hollow intermediate shaft external toothing or form the same. The hollow intermediate shaft external toothing is practically coupled or coupleable to a gear wheel set of the electric motor as a result of which torque provided by the electric motor can be provided on the hollow intermediate shaft on the drive side and transmitted from the same to the transmission device, i.e. concretely to the drive-side planetary gear set.

Practically it is provided that an output-side planetary gear set of the said planetary gear sets coupled to the hollow output shaft is formed by, or comprises:

A so-called simple planetary gear consisting of a central sun gear, a planet gear stage and a ring gear or a so-called double planetary gear, consisting of two axially adjacent simple planetary gears coupled to one another. Accordingly, a planetary gear set can include multiple planetary gears. The said planet gear stage can practically comprise multiple planet gears and a carrier for receiving the planet gears. As a result it is thus possible that the output-side planetary gear set can be realised relatively cost-effectively. Obviously, further planetary gears besides the planetary gear types referred to can also be used here in order to form a planetary gear set.

Further, practically it is provided that the two shifting devices are embodied as separate components. Practically, the shifting devices are also embodied as identical parts, i.e. they are of identical construction. Corresponding shifting devices on the one hand can be provided relatively cost-effectively and on the other hand mounted relatively easily so that a power shift transmission having two shifting devices can be altogether realised cost-effectively.

Practically it is provided that the shifting devices each comprise a load gear wheel, an actuatable multiple-disc braking device for braking and fixing the load gear wheel and a freewheel device for the direction of rotation-dependent coupling of the load gear wheel. Furthermore, it can be provided that the shifting devices are each arranged on a transmission housing of the power shift transmission or at least with respect to the same are formed fixed in place on the power shift transmission.

In order to realise the shifting described above of the planetary gear sets realised by the said planetary gears by means of the said shifting device it is concretely provided that—as a function of the transmission ratio to be provided by means of the transmission device—optionally a sun gear, a planetary gear set or a ring gear of a planetary gear set is directly or indirectly fixed or released via a shifting device.

Accordingly it can be provided that the load gear wheel of a first shifting device of these two shifting devices meshes with an external toothing of a planetary gear set. The external toothing can be preferably arranged on a ring gear in particular on an outer circumferential side of a ring gear of a planetary gear set. Practically this is the said planetary gear set arranged on the drive side which in this case can be preferably formed by a simple planetary gear or a reduced planetary gear. Alternatively, the external toothing can also be provided on a ring gear of the planetary gear set arranged on the output side. A shifting of the corresponding planetary gear set is then possible in that the said ring gear by means of the first shifting device, in particular with respect to the transmission housing of the power shift transmission, is positively fixable or fixed at least in a single set transmission ratio of the transmission device. It should be mentioned that fixing the ring gear by means of the shifting device is achieved in that the load gear wheel of the same is braked and/or fixed by actuating the multiple-disc braking device of the first shifting device as a consequence of which the ring gear coupled to the same is also braked and/or fixed. In summary, the one first shifting device of these shifting devices can directly interact with a drive-side and/or output-side planetary gear set in order to provide a transmission ratio. It should be mentioned that in the fixed state (of the ring gear) a transmission ratio distinct with respect to an unfixed state (of the ring gear) is provided.

Furthermore it is practically provided that the load gear wheel of a second shifting device of these two shifting devices meshes with a driver gear wheel of the clutch. Here, the driver gear wheel is positively fixable by means of the second shifting device in particular with respect to the said stationary transmission housing of the power shift transmission or at least be fixed in a single set transmission ratio of the transmission device. It should be mentioned that the fixing of the driver gear wheel by means of the shifting device is achieved in that the load gear wheel of the same is braked and/or fixed by actuating the multiple-disc braking device of the second shifting device, as a consequence of which the driver gear wheel coupled to the same is also braked and/or fixed. Because of this, the one second shifting device of these two shifting devices can interact with the clutch of the power shift transmission. In interaction with the remaining components of the clutch described in the following, the second shifting device can thus indirectly interact optionally either with a drive-side and/or output-side planetary gear set in order to provide a transmission ratio. It should be mentioned that the second shifting device practically fixes or can fix a planet gear stage or a sun gear of the drive-side planetary gear set and/or a ring gear or a sun gear of the output-side planetary gear set indirectly via the clutch.

In order to be able to provide a preferred transmission ratio or a preferred sequence of transmission ratios and/or a transmission ratio preselection by means of the transmission device it can be provided that the said shifting devices with their actuatable multiple-disc braking device for braking and fixing the respective load gear wheel and the said load freewheel are operated by means of the transmission device as follows:

for a transmission ratio referred to as gear 1 or an initial transmission ratio, releasing (i.e. non-actuating) the multiple-disc braking device of the first shifting device, wherein the freewheel device of the first shifting device blocks, and releasing the multiple-disc braking device of the second shifting device, wherein the freewheel device of the second shifting device blocks, wherein the load freewheel blocks, wherein practically a transmission ratio between a torque introduced on the drive side and a torque provided on an output side of 1/1 materialises; the above and following expressions "locking" must be practically understood to mean that the respective component functionally blocks automatically, for example an active blocking of the freewheel device is not provided; and/or for a transmission preselection referred to as preselection 1+: releasing the multiple-disc braking device of the first shifting device, wherein the freewheel device of the first shifting device blocks, and releasing the multiple-disc braking device of the second shifting device, wherein the freewheel device of the second shifting device blocks, wherein the load freewheel blocks, wherein practically a transmission ratio between a torque introduced on the drive side and a torque provided on the output side of 1/1 materialises; and/or

for a transmission ratio referred to as gear 2: releasing the multiple-disc braking device of the first shifting device, wherein the freewheel device of the first shifting device blocks, and actuating the multiple-disc braking device of the second shifting device, wherein the freewheel device of the second shifting device blocks, wherein the load freewheel blocks, wherein practically a transmission ratio between a torque introduced on the drive side and a torque provided on the output side of 1/1, 15 materialises; and/or for a transmission ratio preselection referred to as preselection 2+: releasing the multiple-disc braking device of the first shifting device, wherein the freewheel device of the first shifting device blocks, and actuating the multiple-disc braking device of the second shifting device and wherein the freewheel device of the second shifting device blocks, wherein the load freewheel blocks, wherein practically a transmission ratio between a torque introduced on the drive side and a torque provided on the output side of 1/1, 15 materialises; and/or for a transmission ratio referred to as gear 3: actuating the multiple-disc braking device of the first shifting device, wherein the freewheel device of the first shifting device blocks, and actuating the multiple-disc braking device of the second shifting device, wherein the freewheel device of the second shifting device is released, wherein the load freewheel blocks, wherein practically a transmission ratio between a torque introduced on the drive side and a torque provided on the output side of 1/1, 25 materialises; and/or for a transmission ratio preselection referred to as preselection 3+: the multiple-disc braking device of the first shifting device blocks, wherein the freewheel device of the first shifting device blocks and releasing the multiple-disc braking device of the second shifting device, wherein the freewheel device of the second shifting device blocks, wherein the load freewheel blocks, wherein practically a transmission ratio between a torque introduced on the drive side and a torque provided on the output side of 1/1, 25 materialises; and/or for a transmission ratio referred to as gear 4: actuating the multiple-disc braking device of the first shifting device, wherein the freewheel device of the first shifting device is released, and actuating the multiple-disc braking device of the second shifting device, wherein the freewheel device of the second shifting device blocks, wherein the load freewheel is released, wherein practically a transmission ratio between a torque introduced on the drive side and a torque provided on the output side of 1/1, 60 materialises; and/or for a transmission ratio preselection referred to as preselection 4+: releasing the multiple-disc braking device of the first shifting device, wherein the freewheel device of the first shifting device blocks, wherein the multiple-disc braking device of the second shifting device blocks, wherein the freewheel device of the second shifting device blocks, wherein the load freewheel is released, wherein practically a transmission ratio between a torque introduced on the drive side and a torque provided on the output side of 1/1, 60 materialises; and/or for a transmission ratio referred to as gear 5: actuating the multiple-disc braking device of the first shifting device, wherein the freewheel device of the first shifting device blocks and actuating the multiple-disc braking device of the second shifting device and releasing the freewheel device of the second shifting device, wherein the load freewheel is released; wherein practically a transmission ratio between a torque introduced on the drive side and a torque provided on the output side of 1/2 materialises; and/or for a transmission ratio preselection referred to as preselection 5+: the multiple-disc braking device of the first shifting device blocks, wherein the freewheel device of the first shifting device blocks, and releasing the multiple-disc braking device of the second shifting device, wherein the freewheel device of the second shifting device blocks, wherein the load freewheel is released, wherein practically a transmission ratio between a torque introduced on the drive side and a torque provided on the output side of 1/2 materialises; and/or for a transmission ratio referred to as gear 6: actuating the multiple-disc braking device of the first shifting device and releasing the freewheel device of the first shifting device and actuating the multiple-disc braking device of the second shifting device, wherein the freewheel device of the second shifting device blocks, wherein the load freewheel is released, wherein practically a transmission ratio between a torque introduced on the drive side and a torque provided on the output side of 1/2, 75 materialises; and/or for a transmission ratio preselection referred to as preselection 6+: releasing the multiple-disc braking device of the first shifting device, wherein the freewheel device of the first shifting device blocks, and actuating the multiple-disc braking device of the second shifting device, wherein the freewheel device of the second shifting device blocks, wherein the load freewheel is released, wherein practically a transmission ratio between a torque introduced on the drive side and a torque provided on the output side of 1/2, 75 materialises; and/or for a transmission ratio referred to as gear 7: actuating the multiple-disc braking device of the first shifting device, wherein the freewheel device of the first shifting device blocks and actuating the multiple-disc braking device of the second shifting device and releasing the freewheel device of the second shifting device, wherein the load freewheel is released, wherein practically a transmission ratio between a torque introduced on the drive side and a torque provided on the output side of 1/3, 9 materialises.

Further practically it is provided that the clutch beside the said driver gear wheel, comprises two claw ring discs arranged on opposite sides of the driver gear wheel so as to be longitudinally moveable that can be actuated by an electromotoric actuating device and a resetting spring device for preloading the claw discs, so that a torque optionally introduced at the claw ring discs can be transmitted to the driver gear wheel or vice versa.

The clutch can be arranged axially, in particular with respect to the centre longitudinal axis between the two planetary gear sets and/or be mounted via sun gear of the output-side planetary gear set on the output-side planetary gear set so as to be rotatably adjustable. A needle bearing is particularly suited for realising the said rotary mounting. Because of this, a preferred embodiment for a clutch is stated by means of which the different transmission ratios can be provided.

Practically it is provided that a first claw ring disc of the two said claw ring discs facing the drive-side planetary gear set is moveable back and forth between a disengaged coupling position, in which the first claw ring disc lies against the planet gear stage of the drive-side planetary gear set touchingly and without slip, and an engaged basic position longitudinally spaced apart in this regard, in which the first claw ring disc is contact-free and spaced apart relative to the planet gear stage of the drive-side planetary gear set and touchingly lies against the sun gear of the drive-side planetary gear set without slip. Further, a second claw ring disc of the two said claw discs facing the output-side planetary gear set, which can be preferably embodied identically to the first claw ring disc, can be moveable back and forth between a disengaged coupling position, in which the second claw ring disc touchingly lies against the ring gear of the output-side planetary gear set without slip, and an engaged basic position which is longitudinally spaced apart in this regard, in which the second claw ring disc is contact-free and spaced apart relative to the ring gear of the output-side planetary gear set and touchingly lies against the sun gear of the output-side planetary gear set without slip. The term "without slip" can mean that the claw discs and their respective friction partner do not describe a relative movement to one another but frictionally lie against one another. It should be mentioned in addition that the first and/or second claw disc can be practically preloaded or is preloaded by means of the resetting spring device either into its basic position or its coupling position. Practically, the resetting spring device comprises two separate spring disc assemblies or two separate disc springs, which are each assigned to a claw disc. This results in an advantageous embodiment and an advantageous working movement of the clutch being stated. Provided that the load gear wheel of the second shifting device meshes with the driver gear wheel of the clutch, a specific fixing or releasing of the ring gears and/or of the planet gear stages and/or the sun gears of the planetary gear sets is thus possible by means of the clutch, so that different transmission ratios can be provided and a preselection of planned transmission ratios be realizable.

A further basic idea of the invention is to state a method for operating the power shift transmission according to the preceding description. Within the scope of this method it is provided that a power shift transmission according to the preceding description is provided in or with an initial transmission ratio of the transmission device, wherein the setting of a desired transmission ratio of the transmission device differing from the initial transmission ratio is realised in that the power shift transmission is provided with at least two or more shifting devices, wherein by actuating a first shifting device of these shifting devices a ring gear of a drive-side planetary gear set is directly fixed or released. By actuating a second shifting device of these shifting devices, a sun gear of the drive-side planetary gear set can be indirectly fixed or released via the clutch and/or a sun gear of an output-side planetary gear set or a ring gear of the output-side planetary gear set be fixed or released, so that as a result different transmission ratios can be provided. Because of this, an advantageous method for providing different transmission ratios by means of the transmission device is stated.

A further basic idea of the invention consists in stating a bicycle, in particular an electric bicycle, having a drive train equipped with at least one power shift transmission according to the preceding description. The power shift transmission is practically equipped for carrying out the method described above for operating a power shift transmission. A drive train of a bicycle equipped with a power shift transmission according to the preceding description is relatively light in weight so that an optimised power to weight ratio for the bicycle is obtained. In addition, the said drive train with a power shift transmission can be embodied so as to be relatively compact, which is desirable in particular when the drive train is to be integrated in the region of a pedal crank of the bicycle.

Practically, an additional or alternative further basic idea of the invention consists in stating a power shift transmission that is improved compared with the known prior art or at least another embodiment of a power shift transmission.

To this end, a power shift transmission provided for a vehicle that can be driven by motor power and/or pedal power, in particular a bicycle, further in particular for example a conventional bicycle purely operated by muscle power or an electric bicycle such as an E-bike or a Pedelec, which comprises a transmission device which transmits a torque that is introduced or can be introduced at a drive of the power shift transmission in a transmission ratio that is settable by gears, to an output of the power shift transmission. It is substantial that the power shift transmission is equipped with two separate controllable and/or regulatable shifting devices, by way of which the transmission device can be shifted or is shifted for setting a transmission ratio of the transmission device. Because of this, the transmission ratio of a torque introduced on the drive side that can be provided by the power shift transmission can be set with merely two shifting devices, so that the power shift transmission according to the invention is a relatively compact and light-weight construction compared with the known power shift transmissions.

Practically, the said power shift transmission is characterised in that its transmission device is equipped with four planetary gear sets each realised in particular by a simple planetary gear set, which further practically are arranged with respect to a centre longitudinal axis of the power shift transmission coaxially and in series and completely engage round about the drive which is realised in particular by a drive shaft defining in its main extension direction the centre longitudinal axis. Further practically, a clutch is arranged axially with respect to the centre longitudinal axis between a first planetary gear set of these planetary gear sets and a second planetary gear set of these planetary gear sets axially adjacent in this regard, a clutch is arranged which, further practically, comprises three separately actuatable shifting elements, a clutch freewheel and a substantially annular clutch part and is equipped in order to connect the first planetary gear set with the remaining planetary gear sets of these planetary gear sets wherein further practically it is provided that the said first shifting device is directly connected to the coupling part of the clutch. Further practically it is provided that the said second shifting device is directly connectable or connected to a planetary gear stage of the fourth planetary gear set or the carrier of the same and indirectly by way of a freewheel, which is also referred to as third freewheel here, to the output, which is realised in particular by a hollow output shaft.

By way of this, a torque that is introduced or can be introduced on the drive side can be provided by way of the described power shift transmission in a transmission ratio set by gears on the output side, wherein the power shift transmission is a relatively light-weight and compact construction, which in particular favours its integration in a vehicle, in particular a bicycle.

Further practically, an additional or alternative further basic idea of the invention consists in stating a power shift transmission that is improved relative to the known prior art or at least another embodiment of a power shift transmission.

To this end, a power shift transmission for a vehicle that can be driven by motor power and/or pedal power, in particular a bicycle, further in particular a conventional bicycle purely operated by muscle power or an electric bicycle such as an E-bike or a Pedelec is provided, which comprises a transmission device which transmits a torque that is introduced or can be introduced on a drive of the power shift transmission in a transmission ratio that is settable by gears, to an output of the power shift transmission. It is substantial that the power shift transmission is equipped with two separate controllable and/or regulatable shifting devices, by way of which the transmission device, for setting a transmission ratio of the transmission device, can be shifted or is shifted. Because of this, the transmission ratio of a torque introduced on the drive side that can be provided by the power shift transmission can be set with merely two shifting devices, so that the power shift transmission according to the invention is of a relatively compact and light-weight construction compared with the known power shift transmissions.

Practically, the said power shift transmission is characterised in that its transmission device is equipped with three planetary gear sets, in particular simple, first and second planetary gear sets and a compound third planetary gear set, which further practically are arranged with respect to a centre longitudinal axis of the power shift transmission coaxially and in series, and completely engage all around the drive, which is realised in particular by a drive shaft defining in its main extension direction the centre longitudinal axis. Further practically, a clutch is arranged axially with respect to the centre longitudinal axis between a first planetary gear set of these planetary gear sets and a second planetary gear set of these planetary gear sets axially adjacent in this regard, which further practically comprises two separately actuatable shifting elements and a substantially annular clutch part. Practically it is provided that the said first shifting device is directly connected to the planet gears of the second planetary gear set and, by way of a freewheel, which is also referred to as third freewheel here, with a central hollow shaft which here is also referred to as third central hollow shaft, wherein the said second shifting device is connected to a ring gear of the third planetary gear set and by way of a further freewheel, which is also referred to as fourth freewheel here, likewise to the central hollow shaft, which is also referred to as third central hollow shaft here.

Because of this and in particular with the help of the details described in the figure description, a torque that is introduced or can be introduced on the drive side can be provided on the output side in a transmission ratio settable by gears by way of the described power shift transmission, wherein the power shift transmission is of a relatively light and compact construction, which in particular favours its integration in a vehicle, in particular a bicycle.

In summary it should be noted: the present invention practically relates to a power shift transmission for a vehicle that can be driven by motor power and/or pedal power comprising a transmission device, which transmits a torque, that is introduced or introducible on a drive in a transmission ratio that is settable by gears, to an output. It is substantial that two separate controllable and/or regulatable shifting devices are provided, by means of which for setting the transmission ratio of the transmission device the same is shiftable, wherein for shifting the transmission device the one shifting device interacts directly and the other shifting device indirectly via a clutch of the power shift transmission with the transmission device. In addition, the invention practically relates to a method for operating the power shift transmission and to a bicycle, in particular an electric bicycle having a power shift transmission.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

It shows, in each case schematically

DETAILED DESCRIPTION

Figure 1:
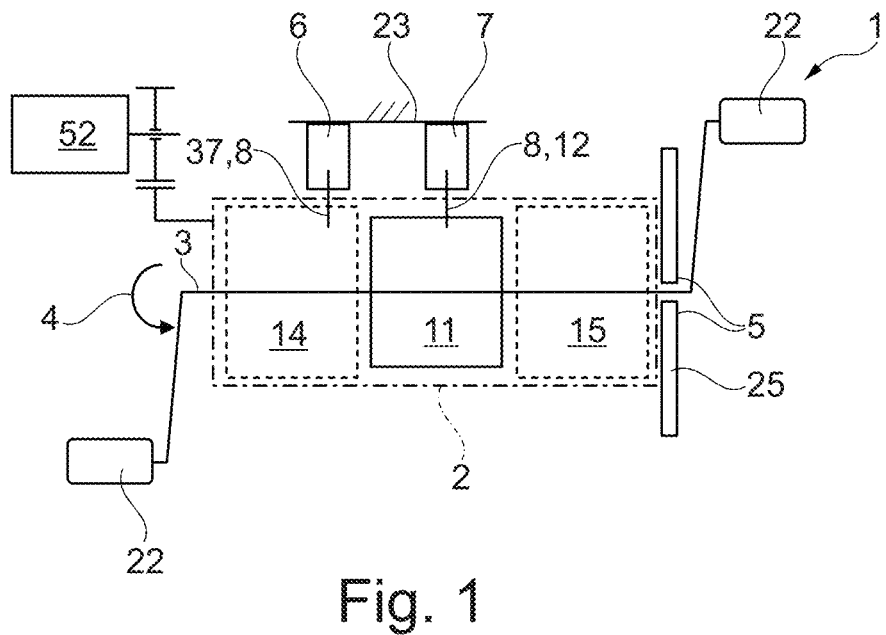
FIG. 1 shows a highly simplified transmission diagram of a power shift transmission according to a preferred embodiment.
Figure 2:
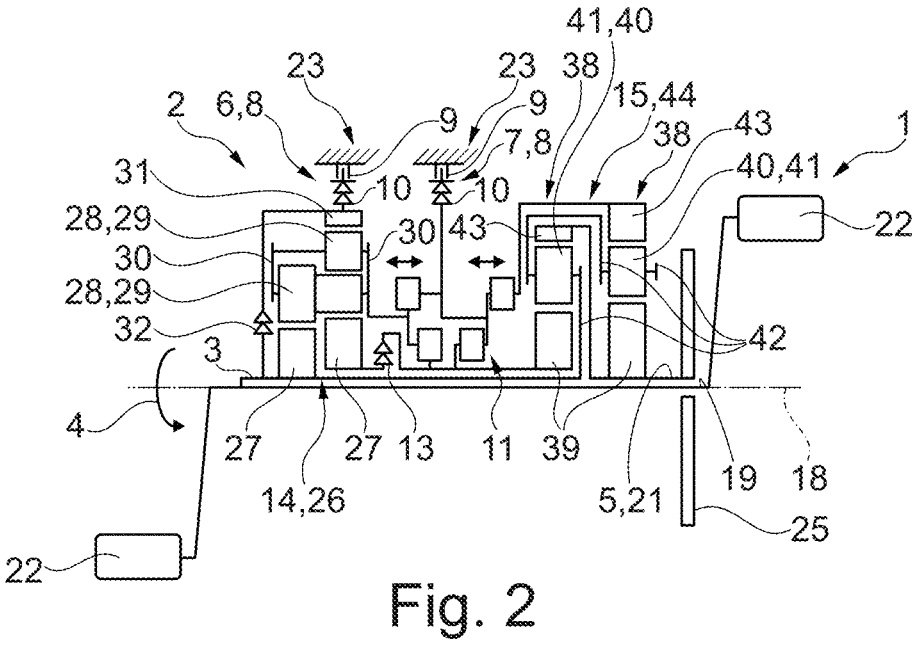
FIG. 2 shows a highly simplified transmission diagram of a power shift transmission according to a preferred further embodiment.
Figure 3:
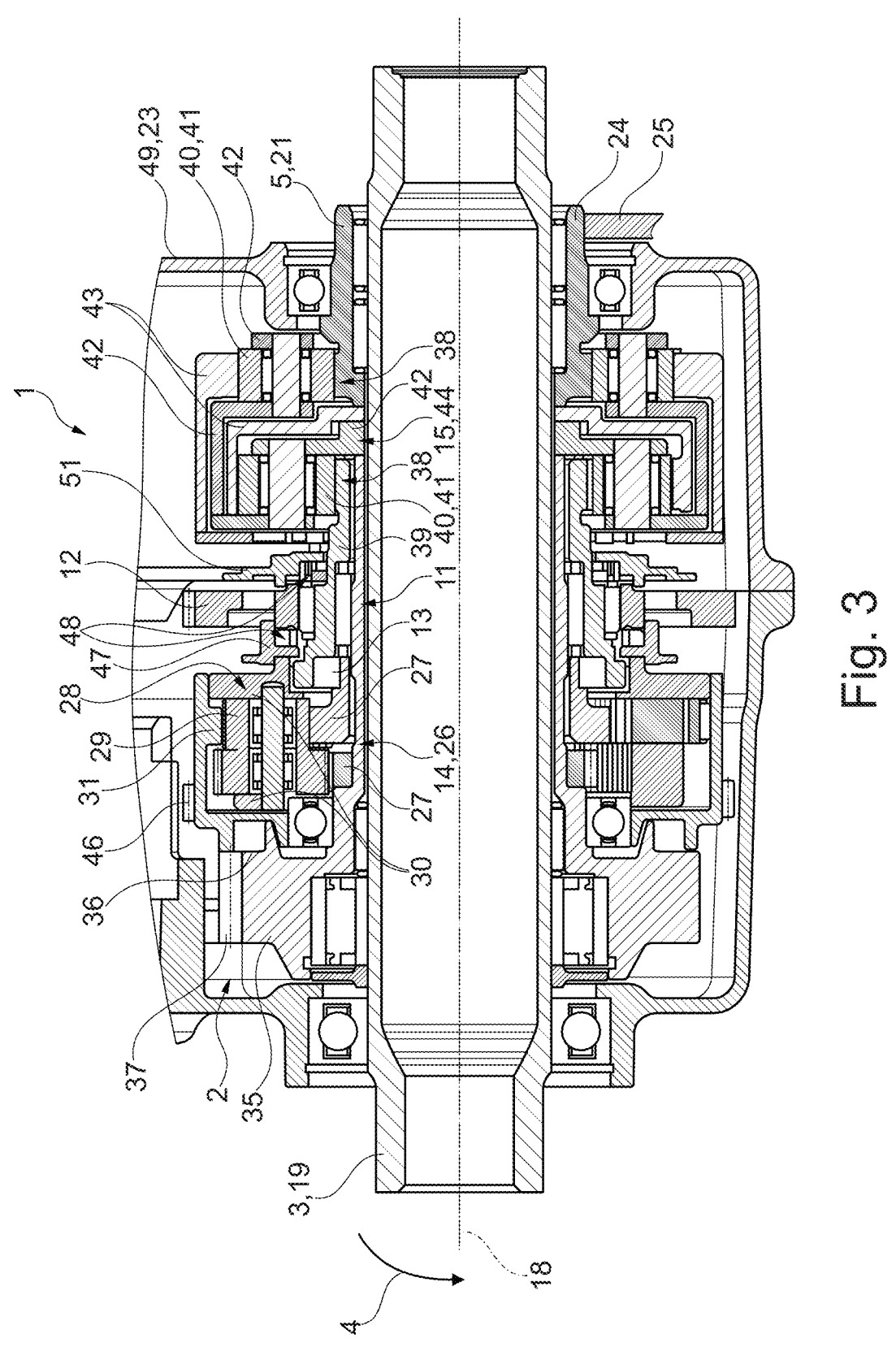
FIG. 3 shows, in a longitudinal sectional view, a power shift transmission according to a preferred further embodiment.

FIGS. 1 to 3 show a power shift transmission in its entirety referred to by the reference number 1 for a bicycle 49 that can be driven with motor power and/or pedal power, which can be for example an electric bicycle (E-bike or Pedelec), which is merely shown in FIG. 3 and only in portions. As such, the power shift transmission 1 can be provided as a bought-out product. Alternatively it can be integrated in a drive train equipped for a bicycle 49 and provided as drive train intermediate product with the same. Further alternatively, the power shift transmission 1 can be integrated in a drive train equipped for a bicycle 49 which in turn is integrated in a bicycle 49 so that as end product a bicycle 49 equipped with the power shift transmission 1 can be provided.

FIG. 1 shows in a highly simplified transmission diagram a power shift transmission 1 according to a preferred embodiment, wherein the components of the same are symbolised by symbol boxes and their mechanical interfaces represented by connecting lines. The power shift transmission 1 comprises a transmission device 2 (the same is shown in FIG. 1 by way of a dash-dotted box which should not be considered binding, but which is not illustrated in FIGS. 2 and 3), which comprises two shiftable transmission sets embodied as planetary gear sets 14, 15 that are coupled to one another. Basically, the planetary gear sets 14, 15 can each be formed by any planetary gear set but simple planetary gears 38, double planetary gears 44 consisting of two simple planetary gears 38 or reduced planetary gears 26 have proved to be advantageous when by means of the transmission device 2 multiple gears, in particular seven gears are to be realised. Furthermore, the power shift transmission 1 comprises a drive 3 and an output 5, wherein the torque 4 introduced on the drive 1, which is provided either by motor power of an electric motor 52 and/or pedal power of pedals 22, is transmitted or transmittable to the output 5 by the transmission device 2 in a transmission ratio that is settable by gears. It is substantial that the power shift transmission 1 comprises two separate controllable and/or regulatable shifting devices 6, 7, which are each embodied as separate components and immovably attached to a transmission housing 23 of the power shift transmission 1 and for setting the transmission ratio of the transmission device 2 can interact with the transmission device 2, in particular directly and/or indirectly via a clutch 11 of the power shift transmission 1. The shifting devices 6, 7 are each exemplarily equipped with a load gear wheel 8 which is not shown in detail, an actuatable multiple-disc braking device 9 for braking and fixing the load gear wheel 8 and a freewheel device 10 for the direction of rotation-dependent coupling of the load gear wheel 8. For setting the transmission ratio it is concretely provided that a first shifting device 6 of the said shifting devices 6, 7 can directly shift or shifts a planetary gear set 14 of the said planetary gear sets 14, 15 arranged on the drive side while the other second shifting device 7 of the said shifting devices 6, 7 can shift or shifts, indirectly via the said clutch 11 of the power shift transmission 1 which is arranged axially with respect to a centre longitudinal axis 18 still to be described in the following, and/or the other planetary gear set 15 of the planetary gear sets 14, 15 arranged on the output side. Because of this, a transmission ratio of the torque 4 introduced on the drive side that can be provided by the power shift transmission 1 can be realised by means of the two shifting devices 6, 7. Since merely two shifting devices 6, 7 are used, the illustrated power shift transmission 1, compared with the known power shift transmissions, is a relatively compact and light-weight construction. The compact design is favoured in particular also because the clutch 11 is arranged axially with respect to the centre longitudinal axis 18 quasi-sandwiched between the planetary gear sets 14, 15.

FIG. 2 shows in a simplified transmission diagram a power shift transmission 1 according to a preferred further embodiment, the components of which substantially correspond to those of the embodiment of the power shift transmission 1 illustrated in FIG. 1. It is noticeable that the planetary gear set 14 of the transmission device 2 arranged on the drive side which, as mentioned, is not indicated by a dashed-line box here for the sake of clarity, is realised by a reduced planetary gear 26, which is constructed out of two central sun gears 27, a planetary gear stage 28 comprising multiple planet gears 29 supported via a carrier 30 and a ring gear 31. The planetary gear set 15 arranged on the output side is exemplarily realised by a double planetary gear 44 of two simple planetary gears 38, wherein each simple planetary gear 38 is constructed out of a central sun gear 39, a planet gear stage 40 comprising multiple planet gears 41 supported via a carrier 42, and a ring gear 43. In FIG. 2 it is noticeable, furthermore, that the said drive 3 comprises a drive shaft 19 defining in its main extension direction the said centre longitudinal axis 18, for introducing the torque 4 introduced on the drive side. On the drive shaft 19, a hollow output shaft 21 forming the said output 5 is mounted coaxially with respect to the centre longitudinal axis 18 so as to be rotatably adjustable. The described planetary gear sets 14, 15 are arranged axially with respect to the centre longitudinal axis 18 in series and at least with their sun gears 27, 39 and ring gears 31, 43, coaxially with respect to the centre longitudinal axis 18 and/or coupled to the drive shaft 19 and/or the hollow output shaft 21. The said clutch 11, as mentioned, is axially arranged with respect to the centre longitudinal axis 18 between the planetary gear sets 14, 15. In FIG. 2 it is illustrated, furthermore, that the planetary gear sets 14, 15 are coupled to one another via a load freewheel 13, so that torque is merely transmittable dependent on the direction of rotation between the planetary gear sets 14, 15. Further it is noticeable that the ring gear 31 of the planetary gear set 14 of the transmission device 2 arranged on the drive side is assigned a freewheel 32, wherein it is coupled via the said freewheel 32 to the drive shaft 19 dependent on the direction of rotation.

FIG. 3 shows in a longitudinal sectional view a power shift transmission 1 according to a preferred further embodiment, wherein the components of the illustrated power shift transmission 1 substantially correspond to those of the embodiments of the power shift transmission 1 illustrated in FIGS. 1 and 2. Although the shown power shift transmission 1 is not to scale, FIG. 3 can be practically considered as production drawing so that it not only has a symbolic character. In contrast with FIGS. 1 and 2, FIG. 3 shows a spatial/bodily configuration of the power shift transmission 1, wherein it is noticeable that the said drive shaft 19 is embodied as hollow shaft and that the said hollow output shaft 21 forming the output 5 is mounted so as to be rotatably adjustable outside on the drive shaft 19. The hollow output shaft 21 encloses the drive shaft 19 coaxially with respect to the centre longitudinal axis 18 and protrudes laterally over the said transmission housing 23 of the power shift transmission 1 in the direction of the longitudinal centre axis 18, so that an axial protrusion 24 is formed, on which an attachment part 25, which in practice is in particular referred to as "spider" can be arranged. Coupling the drive shaft 19 to the drive-side planetary gear set 14 of the said planetary gear sets 14, 15 can be realised with the interconnection of a hollow intermediate shaft 35 of the power shift transmission 1 that is coupled or coupleable to the electric motor 52. The drive-side planetary gear set 14 for this purpose is exemplarily coupled via a freewheel 36 to the hollow intermediate shaft 35, which in turn is coupled to the drive shaft 19. The hollow intermediate shaft 35 exemplarily has a hollow intermediate shaft external toothing 37, via which it is coupled to the electric motor 52, so that torque 4 provided by the electric motor 52 can be provided on the drive shaft 19 or the hollow intermediate shaft 52 and transmitted from the same to the transmission device 2.

In FIG. 3 it is noticeable, furthermore, that the clutch 11 comprises a driver gear wheel 12, two actuatable claw ring discs 47, 51 that are arranged on opposite sides of the driver gear wheel 12 so as to be non-rotatable and with respect to the centre longitudinal axis 18, longitudinally moveable, so that a torque introduced on the claw ring discs 47, 51 can be transmitted to the driver gear wheel 12 or vice versa. The claw ring discs 47, 51 can each be arranged on splines, which allow an easy axial movement in the direction of the centre longitudinal axis 18 and/or can each be longitudinally actuated via a resetting device 48 which is not completely shown here, in particular via a shifting fork each hat is longitudinally moveable in the direction of the centre longitudinal axis 18. Since the clutch 11, as mentioned, is arranged axially with respect to the centre longitudinal axis 18 between the two planetary gear sets 14, 15, the first claw ring disc 47 of the two said claw ring discs 47, 51 facing the drive-side planetary gear set 14 can be moved back and forth between a disengaged clutch position, in which the first claw ring disc 47 touchingly and without slip and/or positively lies against the planet gear stage 28 of the drive-side planetary gear set 14, and an engaged basic position which is longitudinally spaced apart in this regard, in which the first claw ring disc 47 is contact-free and spaced apart relative to the planet gear stage 28 of the drive-side planetary gear set 14 and touchingly and without slip and/or positively lies against the sun gear 27 of the drive-side planetary gear set 14. In addition, the second claw ring disc 51 of the two said claw discs 47, 51 facing the output-side planetary gear set 15 can also be moved back and forth between a disengaged clutch position in which the second claw ring disc 51 touchingly and without slip and/or positively lies against the ring gear 43 of the output-side planetary gear set 15 and an engaged basic position longitudinally spaced apart in this regard, in which the second claw ring disc 51 is contact-free and spaced apart relative to the ring gear 43 of the output-side planetary gear set 15 and touchingly and without slip and/or positively lies against the sun gear 39 of the output-side planetary gear set 15.

For setting a transmission ratio of the transmission device 2, i.e, for shifting the planetary gear sets 14, 15, it is provided that the load gear wheel 8 of the first shifting device 6 meshes with an external toothing 46 of the ring gear 31 of the planetary gear set 14 arranged on the drive-side, wherein the said ring gear 31 by means of the first shifting device 6, with respect to the said transmission housing 23 of the power shift transmission 1, is positively fixable or fixed at least in a single set transmission ratio of the transmission device 2. A rotation of the ring gear 31 about the centre longitudinal axis 18 is thus no longer possible. Furthermore, for setting a transmission ratio of the transmission device 2, i.e. for shifting the planetary gear sets 14, 15, it is provided that the load gear wheel 8 of the second shifting device 7 meshes with the driver gear wheel 12 of the clutch 11, wherein the said driver gear wheel 12, by means of the second shifting device 7, is positively fixable with respect to the transmission housing 23 or is at least fixed in a single set transmission ratio of the transmission device 2. A rotation of the driver gear wheel 12 about the centre longitudinal axis 18 is thus no longer possible. As a result a sun gear and/or a planet gear set and/or a ring gear of the planetary gear sets 14, 15 can be optionally fixed or released by means of the two shifting devices 6, 7, so that interacting with the remaining components of the power shift transmission 1 preferred transmission ratios of the torque 4, in particular by seven gears can be provided.

Figure 4:
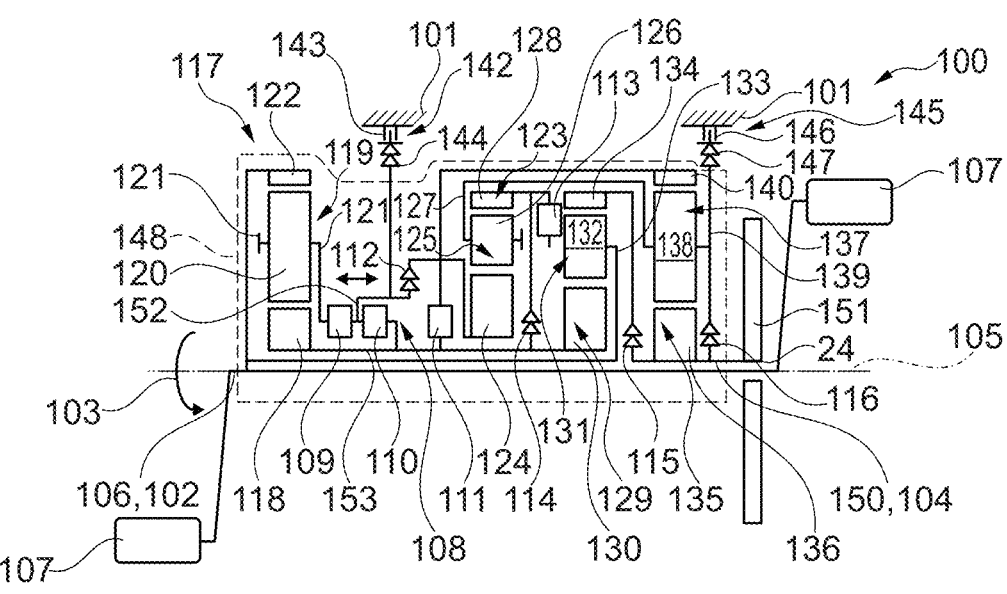
FIG. 4 shows a highly simplified transmission diagram of a power shift transmission according to a preferred further embodiment.
Figure 5:
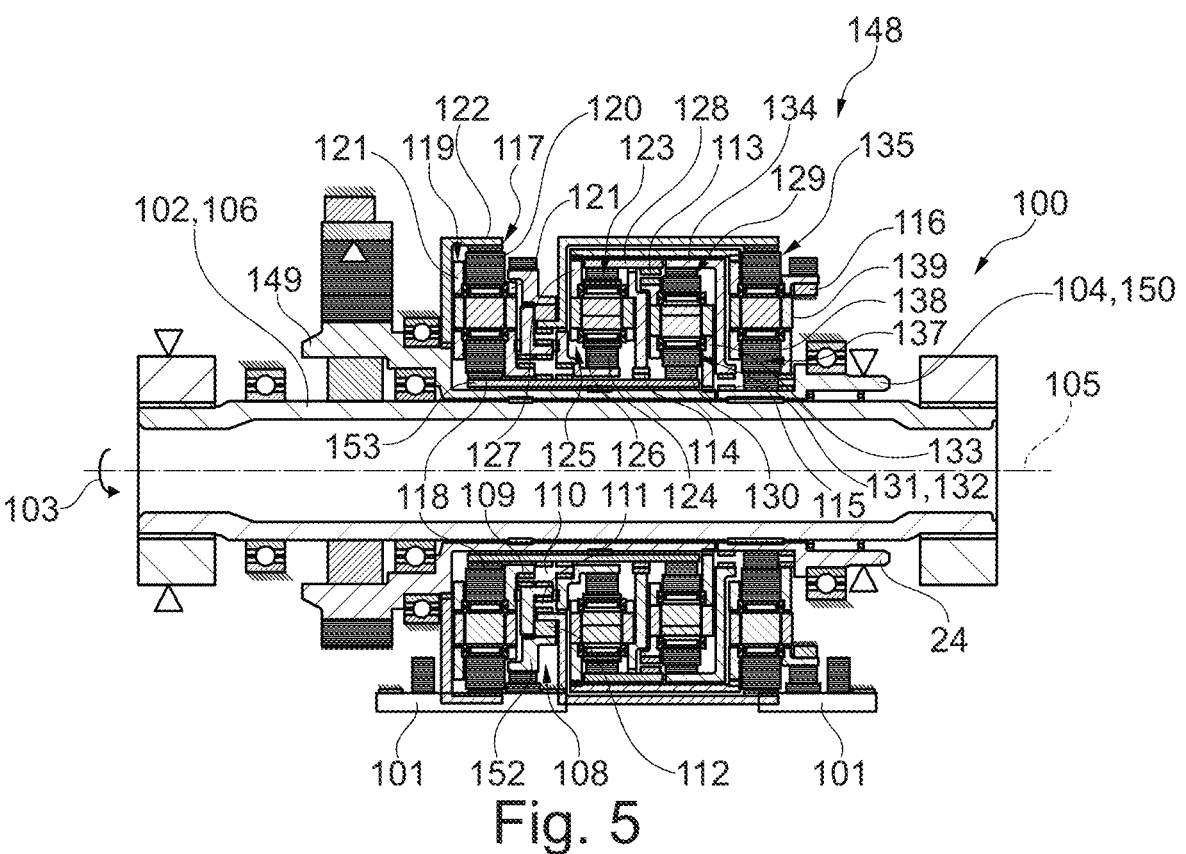
FIG. 5 shows, in a longitudinal sectional view, a power shift transmission according to a preferred further embodiment.

In FIGS. 4 and 5, optional embodiments of a power shift transmission referred to in its entirety with the reference number 100 for a vehicle that is not shown that can be driven by motor power and/or pedal power, in particular a bicycle, further in particular for example a conventional bicycle purely operated by muscle power or an electric bicycle such as an E-bike or a Pedelec are stated, in FIG. 4 by way of a highly simplified transmission diagram a power shift transmission 100 according to a preferred embodiment and in FIG. 5 by way of a longitudinal sectional view a power shift transmission 100 according to a preferred further embodiment. The power shift transmission 100, as before, comprises a transmission device 148 which in FIG. 4 is roughly indicated by a dashed-line box not to be considered binding and transmits a torque 103 that is introduced or can be introduced on a drive 102 of the power shift transmission 100 in a transmission ratio that is settable by gears, to an output 104 of the power shift transmission 100. It is substantial that the power shift transmission 100 is equipped with two separate controllable and/or regulatable shifting devices 1042, 145, by way of which the transmission device 148, for setting a transmission ratio of the transmission device 148, is shiftable or shifted. By way of this, the transmission ratio of the torque 103 introduced on the drive side that can be provided by the power shift transmission 100 can be set with merely two shifting devices 1042, 145 so that the power shift transmission 100 is a relatively compact and light-weight construction compared with the known power shift transmissions.

Concretely, the power shift transmission 100, wherein the following description refers both to FIG. 4 and also to FIG. 5, has a transmission housing 101 which is penetrated by the said drive 102, which is realised by a drive shaft 106 defining in its main extension direction a centre longitudinal axis 105, wherein on axial protrusions of the drive shaft 106 protruding over the transmission housing 101 on both sides, pedals 107 for introducing pedal power are arranged. On the drive shaft 106, the mentioned torque 103 can be provided by way of the pedal power and/or obviously also by way of motor power/motor torque of an electric motor that is not illustrated. The latter can be realised for example by means of an auxiliary hollow shaft 149, see FIG. 5, which engages round about the drive shaft 106 on the outside, arranged coaxially to the centre longitudinal axis 105, on which at one end by way of an external toothing the motor power/motor torque of the electric motor can be introduced and at the other end the same be transmitted to the remaining components of the transmission device 148. Furthermore it is provided that on the said drive shaft 106 a hollow output shaft 150 forming the said output 104 is mounted so as to be rotatably adjustable, wherein the same engages round about the drive shaft 106 on the outside and is oriented coaxially with respect to the centre longitudinal axis 105. On a side of the hollow output shaft 150 facing away with respect to the transmission housing 101, in particular in the region of an axial protrusion 24 of the drive shaft 106, an attachment part 151 which in practice is referred to in particular as spider can be arranged, which is merely symbolically indicated in FIG. 4. Drive shaft 106 and hollow output shaft 150 are connected to one another by way of the transmission device 148 so that the torque 103 introduced on the drive shaft 106 can be transmitted to the hollow output shaft 150, wherein by way of the two said shifting devices 142, 145 which are each fixed on the transmission housing 105, the torque 103 can be transmitted in a transmission ratio settable by gears from the drive shaft 106 to the hollow output shaft 150.

It is provided that the transmission device 148 comprises four separate planetary gear sets 117, 123, 129, 135 which with respect to the centre longitudinal axis 105 are arranged coaxially and in series, wherein the first planetary gear set 117 faces the drive 102 and the fourth planetary gear set 135 faces the attachment part 151. Exemplarily, the planetary gear sets 117, 123, 129, 135 are each formed by simple planetary gears although they could all or at least one of them be realised for example by a compound planetary gear. The first planetary gear set 117 accordingly comprises: a central sun gear 118 arranged coaxially with respect to the centre longitudinal axis 105, a ring gear 122 located outside and a planet gear stage 119 of the planet gears 120 arranged between the sun gear 118 and the ring gear 122, which are arranged on a carrier 121. The said sun gear 118 meshes with the said planet gears 120, which in turn mesh with the said ring gear 122. The second planetary gear set 123 accordingly comprises: a central sun gear 124 arranged coaxially with respect to the centre longitudinal axis 105, a ring gear 128 located outside and a planet gear stage 125 of planet gears 126 arranged between the sun gear 124 and the ring gear 128, which are arranged on a carrier 127. The said sun gear 124 meshes with the said planet gears 126, which in turn mesh with the said ring gear 128. The third planetary gear set 129 according comprises: a central sun gear 130 arranged coaxially with respect to the centre longitudinal axis 105, a ring gear (134) located outside and a planet gear stage 131 of planet gears 132 arranged between the sun gear 130 and the ring gear 134, which are arranged on a carrier 133. The said sun gear 130 meshes with the said planet gears 132, which in turn mesh with the said ring gear 134. The fourth planetary gear set 135 accordingly comprises: a central sun gear 136 arranged coaxially with respect to the centre longitudinal axis 105, a ring gear 140 located outside and a planet gear stage 137 of planet gears 138 arranged between the sun gear 136 and the ring gear 140, which are arranged on a carrier 139. The sun gear 136 meshes with the said planet gears 138, which in turn mesh with the said ring gear 140. Beside the said four planetary gear sets 117, 123, 129, 135, the transmission device 148 comprises a central hollow shaft 153 which engages round about the drive shaft 106 on the outside and is oriented coaxially with respect to the centre longitudinal axis 105, and axially with respect to the longitudinal centre axis 105 between the first planetary gear set 117 and the second planetary gear set 123, an assembly referred to as clutch 108. The clutch 108 altogether comprises three separately actuatable shifting elements 109, 110, 111, a freewheel referred to as clutch freewheel 112 for the sake of better distinction and a substantially annular clutch part 152. Furthermore, a further fourth shifting element 113 of the transmission device 148 and a further first freewheel 114 of the transmission device 148 are additionally arranged axially with respect to the centre longitudinal axis 105 between the second planetary gear set 123 and the third planetary gear set 129. Furthermore, a further second freewheel 115 of the transmission device 148 is arranged axially with respect to the centre longitudinal axis 105 between the third planetary gear set 129 and the fourth planetary gear set 135. Finally, a further third freewheel 116 of the transmission device 148 is arranged axially with respect to the centre longitudinal axis 105 between the fourth planetary gear set 129 and the attachment part 151.

In order to realise the said transmission ratio of the introduced torque 103 it is practically provided that the ring gear 122 of the first planetary gear set 117 is connected to the hollow output shaft 150, in particular to the auxiliary hollow shaft 149, and the sun gear 118 of the first planetary gear set 117 to the central hollow shaft 153.

Furthermore, the planet gear stage 119 of the first planetary gear set 117 or its carrier 121 can be connected or is connected for this purpose to the clutch part 152 of the clutch 108 by way of the first shifting element 109 of the clutch 108 by actuating the first shifting element 109.

Furthermore, the clutch part 152 of the clutch 108 for this purpose can be connected or is connected by way of the said clutch freewheel 112 to the sun gear 118 of the second planetary gear set 123, the ring gear 140 of the fourth planetary gear set 135 and the third shifting element 111 of the clutch 108.

Furthermore, the clutch part 152 of the clutch 108 for this purpose can be connected or is connected by way of the second shifting element 110 of the clutch 108 to the central hollow shaft 153.

Furthermore, the clutch part 152 of the clutch 108 for this purpose is directly connected, for example by way of an external toothing 154 of the clutch part 152 looking radially to the outside arranged on an outer circumferential surface of the clutch part 152, to the said first shifting device 142. For this purpose, the same can practically comprise a load gear wheel meshing with the external toothing 154 of the clutch part 152.

Furthermore, it is provided that the planet gear stage 125 of the second planetary gear set 123 or its carrier 127 is connected to the planet gear stage 137 of the fourth planetary gear set 135 or its carrier 139. Further, the ring gear 128 of the second planetary gear set 123 can be connected or is connected by way of the fourth shifting element 113 arranged axially between the second and third planetary gear set 123, 129, to the planet gear stage 131 of the third planetary gear set 129 or its carrier 133.

Furthermore, the ring gear 128 of the second planetary gear set 123 and/or the planet gear stage 131 of the third planetary gear set 129 or its carrier 133, depending on whether the fourth shifting element 113 is actuated or not, can be connected or is connected to the central hollow shaft 153 by way of the first freewheel 114 arranged axially between the second and third planetary gear set 123, 129.

Furthermore, it is provided for this purpose that the sun gear 130 of the third planetary gear set 129 is connected to the central hollow shaft 153. Furthermore, the planet gear stage 131 of the third planetary gear set 129 is connected to the hollow output shaft 150, in particular to the auxiliary hollow shaft 149.

Furthermore, it is provided for this purpose that by way of the second freewheel 115, which is arranged axially between the third and fourth planetary gear set 129, 135, the ring gear 134 of the third planetary gear set 129 can be connected or is connected to the hollow output shaft 150.

Furthermore, it is provided for this purpose that the sun gear 136 of the fourth planetary gear set 135 is connected to the hollow output shaft 150.

Finally it is provided for this purpose that the planet gear stage 137 of the fourth planetary gear set 135 or its carrier 139 is directly connected, for example by way of a further external toothing 155 looking radially to the outside arranged on an outer circumferential surface of the planet gear stage 137 or its carrier 139, to the said second shifting device 145, wherein by way of the third freewheel 116, which is arranged axially between the fourth planetary gear set 135 and the attachment part 151, the planet gear stage 137 of the fourth planetary gear set 135 or its carrier 139 and the second shifting device 145 can be connected or are connected to the hollow output shaft 150. The second shifting device 145 can be practically equipped with a load gear wheel meshing with the further external toothing 155.

Practically it is provided that the shifting devices 142, 145 each comprise a load gear wheel, an actuatable multiple-disc braking device 143, 146 for braking and fixing the respective load gear wheel and a freewheel device 144, 147 for the direction of rotation-dependent coupling of the respective load gear wheel.

Thus, by way of the power shift transmission 100 described in FIGS. 4 and 5, a torque 103 introduced or introducible on the drive side can be provided on the output side in a transmission ratio that is settable by gears, wherein the power shift transmission 100 is a relatively light and compact construction, which in particular favours its integration in a vehicle, in particular a bicycle.

Figures 6, 7:
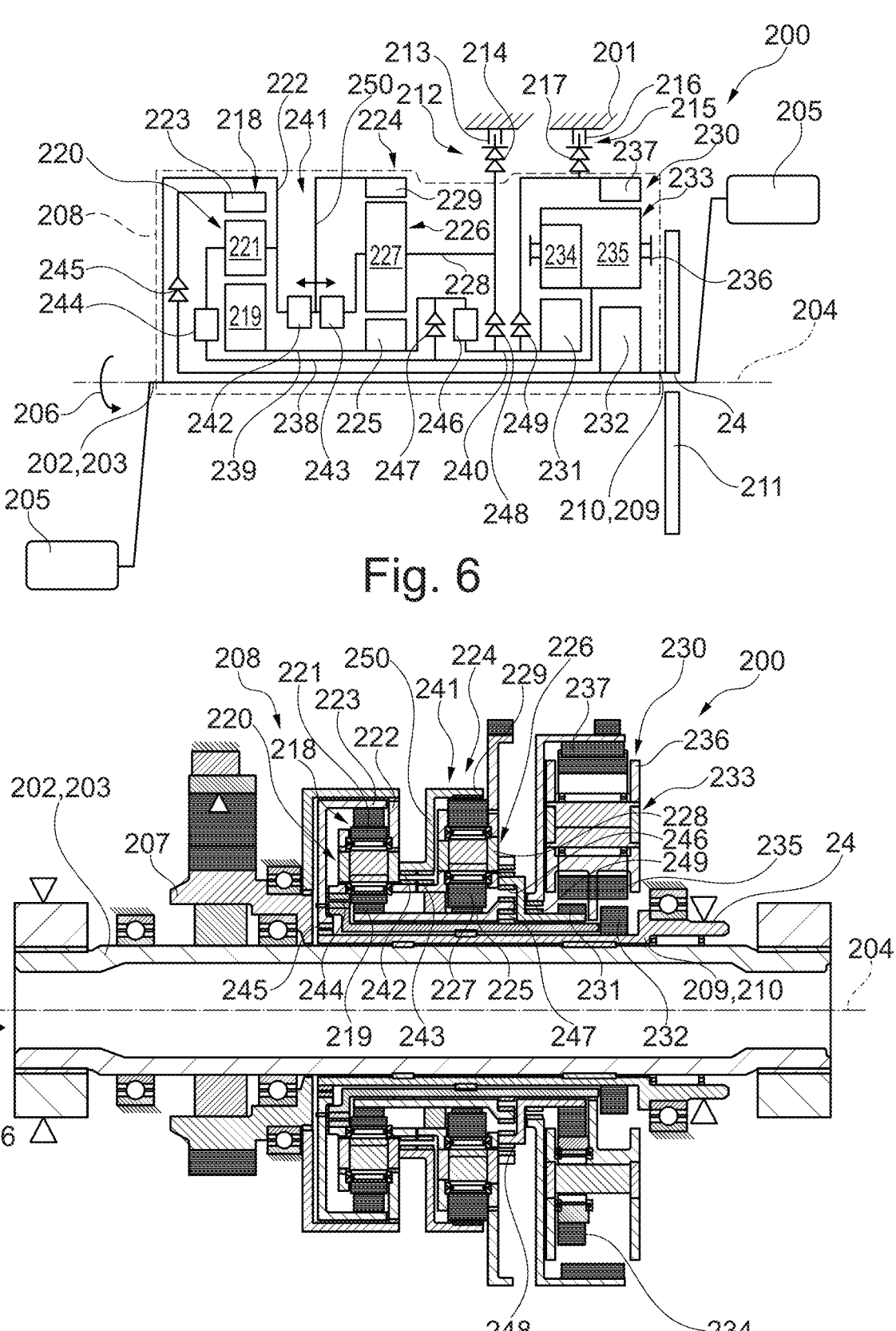
FIG. 6 shows a simplified transmission diagram of a power shift transmission according to a preferred further embodiment, and finally
FIG. 7 shows, in a longitudinal sectional view, a power shift transmission according to a preferred further embodiment.

In FIGS. 6 and 7, an optional embodiment of a power shift transmission referred to in its entirety by the reference number 200 for a vehicle that can be driven by motor power and/or pedal power, in particular a bicycle, further in particular for example a conventional bicycle operated purely with muscle power or an electric bicycle such as an E-bike or a Pedelec is provided, which comprises a transmission device 208 which in FIG. 6 is roughly indicated by a dashed-line box not to be considered as binding and transmits a torque 206 introduced or introducible on a drive 202 of the power shift transmission 200 in a transmission ratio that is settable by gears to an output 209 of the power shift transmission 200. It is substantial that the power shift transmission 200 is equipped with two separate controllable and/or regulatable shifting devices 212, 215, by way of which the transmission device 208, for setting a transmission ratio of the transmission device 208, can be shifted or is shifted. Because of this, the transmission ratio of the torque 206 introduced on the drive side that can be provided by the power shift transmission 200 can be set with merely two shifting devices 212, 215, so that the power shift transmission 200 compared with known power shift transmissions is a relatively compact and light-weight construction.

Concretely, the said power shift transmission 200 is characterised in that, wherein the following description relates both to FIG. 6 and also FIG. 7, in that it has a transmission housing 201, which is penetrated by the said drive 202, which is realised by a drive shaft 203 defining in its main extension direction a centre longitudinal axis 204, wherein on axial protrusions of the drive shaft 203 protruding over the transmission housing 201 on both sides, pedals 205 for introducing pedal power are arranged. On the drive shaft 203, the mentioned torque 206 can also be provided by way of the pedal power and/or obviously also by way of motor power/motor torque of an electric motor that is not illustrated. The latter can be realised for example with the help of an auxiliary hollow shaft 207, see FIG. 7, that is arranged coaxially to the centre longitudinal axis 204 engaging the drive shaft 203 all around on the outside, on which at one end by way of an external toothing the motor power/motor torque of the electric motor can be introduced and on the other end the same be transmitted to the remaining components of the transmission device 208. Furthermore, it is provided that on the said drive shaft 203 a hollow output shaft 210 forming the said output 209 is mounted so as to be rotatably adjustable, wherein the same engages the drive shaft 203 all around on the outside and is oriented coaxially with respect to the centre longitudinal axis 204. On a side of the hollow output shaft 210 facing away with respect to the transmission housing 201, in particular in the region of an axial protrusion 24 of the hollow output shaft 210, an attachment 211 referred to in particular as spider in practice can be arranged. Drive shaft 203 and hollow output shaft 210 are connected to one another by way of the transmission device 208 so that the torque 206 introduced on the drive shaft 203 can be transmitted to the hollow output shaft 210, wherein by way of the two said shifting devices 212, 215, which are each fixed on the transmission housing 201, the torque 206 can be transmitted in a transmission ratio settable by gears from the drive shaft 203 to the hollow output shaft 210.

It is provided that the transmission device 208 comprises three separate planetary gear sets 218, 224, 230, which with respect to the centre longitudinal axis 204 are arranged coaxially and in series, wherein the first planetary gear set 218 faces the drive 202 and the third planetary gear set 230 faces the attachment part 211. Exemplarily, the first planetary gear set 218 and the second planetary gear set 224 are each formed by simple planetary gears while the third planetary gear set 230 is realised by a compound planetary gear. The first planetary gear set 218 accordingly comprises: a central sun gear 219 arranged coaxially with respect to the centre longitudinal axis 204, a ring gear 223 located outside and a planet gear stage 220 of the planet gears 221 arranged between the sun gear 219 and the ring gear 223, which are arranged on a carrier 222. The said sun gear 219 meshes with the said planet gears 221, which in turn mesh with the said ring gear 223. Accordingly, the second planetary gear set 224 comprises: a central sun gear 225 arranged coaxially with respect to the centre longitudinal axis 204, a ring gear 229 located outside and a planet gear stage 226 of planet gears 227 arranged between the sun gear 225 and the ring gear 229, which planet gears 227 are arranged on a carrier 228. The said sun gear 225 meshes with the said planet gears 227, which in turn mesh with the said ring gear 229. The third, compound planetary gear set 230 accordingly comprises: a first, central sun gear 231 arranged with respect to the centre longitudinal axis 204 coaxially and adjacent to the second planetary gear set 224, a second central sun gear 232 arranged coaxially with respect to the centre longitudinal axis 204, a ring gear 237 located outside and a planet gear stage 233 arranged between the two sun gears 231, 232 and the ring gear 237 consisting of first planet gears 234 and second planet gears 235, which are arranged on a common carrier 236. The first sun gear 231 meshes with the first planet gears 234. Further, the first sun gear 231 and the second sun gear 232 additionally mesh with the second planet gears 235, which compared with the first planet gears 234 are adequately extended in the axial direction with respect to the centre longitudinal axis 204 for this purpose, for example they are each configured twice as long as the first planet gears 234. The second planet gears 205 also mesh with the said ring gear 237, the first planet gears 234 in particular do not mesh with the ring gear 237, which for this purpose, compared with the second planet gears 235, are configured with a smaller gear wheel diameter than the second planet gears 235. For example, the gear wheel diameters of the first planet gears 234 can each be configured smaller, in particular half the size of the gear wheel diameter of the second planet gears 235.

Beside the said planetary gear sets 218, 224, 230, the transmission device 208 comprises a first central hollow shaft 238 which is oriented coaxially with respect to the centre longitudinal axis 204 and engages all around the hollow output shaft 210 on the outside, on which a second central hollow shaft 239 oriented coaxially with respect to the centre longitudinal axis 204 and engaging round about the first central hollow shaft 238 and a third central hollow shaft 240 oriented coaxially with respect to the centre longitudinal axis 204 and engaging all around about the first central hollow shaft 238 are arranged. In particular, the second central hollow shaft 239 and the third central hollow shaft 240 are located opposite one another with respect to the centre longitudinal axis 204.

Furthermore, an assembly referred to as clutch 241 is arranged axially with respect to the centre longitudinal axis 204 between the first planetary gear set 218 and the second planetary gear set 224, which altogether has two separately actuatable shifting elements 242, 243 and a clutch part 250, which here is formed integrally with the ring gear 229 of the second planetary gear set 224.

Furthermore, the transmission device 208 comprises a third shifting element 244 arranged axially with respect to the centre longitudinal axis 204 between the first planetary gear set 218 and an axial protrusion of the drive shafts 203 as well as a first freewheel 245. Further, the transmission device 208 comprises a fourth shifting element 246 arranged axially with respect to the centre longitudinal axis 204 between the second planetary gear set 224 and the third compound planetary gear set 230 as well as a second, third and fourth freewheel 247, 248, 249.

In order to realise the said transmission ratio of the introduced torque 206 it is practically provided that the ring gear 223 of the first planetary gear set 218 is connected by way of the first freewheel 245 to the hollow output shaft 210, that the planet gear stage 220 of the first planetary gear set 218 can be connected or is connected by way of the first shifting element 242 to the first central hollow shaft 238 and that the sun gear 219 of the first planetary gear set 218 is connected to the second central hollow shaft 239. Furthermore, the planet gear stage 220 of the first planetary gear set 218 is connected to the drive shaft 203.

Furthermore, it is provided that the clutch part 250 of the clutch 241 can be connected or is connected by way of the second shifting element 243 to the planet gear stage 220 of the first planetary gear set 218, that the clutch part 250 of the clutch 241 by way of the third shifting element 244 can be connected or is connected to the planet gear stage 226 of the secondary planetary gear set 224. Further, as explained, the clutch part 250 of the clutch 241 is integrally connected to the ring gear 229 of the second planetary gear set 224. With respect to the second planetary gear set 224 it should be added that its planet gear stage 226 is directly connected to the first shifting element 242 and by way of the third freewheel 248 connected to the third central hollow shaft 240. Furthermore, the sun gear 225 of the second planetary gear set 224 is connected to the second central hollow shaft 239. Furthermore, it is provided that the second central hollow shaft 239 is connected by way of the second freewheel 247 to the first central hollow shaft 238 and by way of the fourth shifting element 246 can be connected or is connected to the third central hollow shaft 240. With respect to the third planetary gear set 230 it must still be explained that its first sun gear 231 is connected to the third central hollow shaft 240, that its second sun gear 232 is connected to the hollow output shaft 210, that its planet gear stage 233 or its carrier 236 is connected to the first central hollow shaft 238 and that its ring gear 237 is connected by way of the fourth freewheel 249 to the third central hollow shaft 240. Here, the second shifting element 243 is directly connected to the ring gear 237 of the third planetary gear set 230.

Practically it is provided that the two shifting devices 212, 215 each comprise a load gear wheel, an actuatable multiple-disc braking device 213, 216 for braking and fixing the respective load gear wheel and a freewheel device 214, 217 for the direction of rotation-dependent coupling of the respective load gear wheel.

Because of this, a torque 206 introduced or introducible on the drive side in a transmission ratio settable by gears can be provided on the output side by way of the power shift transmission 200 described in FIGS. 6 and 7, wherein the power shift transmission 200 is a relatively light and compact construction, which favours in particular its integration in a vehicle, in particular a bicycle.

The invention claimed is:

1. A power shift transmission for a vehicle driveable by motor power and/or pedal power, comprising:

a transmission device which transmits a torque introducible on a drive in a transmission ratio settable via a plurality of gears to an output, the transmission device including a load freewheel and at least two shiftable planetary gear sets that are coupled to one another via the load freewheel; and two shifting devices via which the transmission device is shiftable for setting the transmission ratio of the transmission device.

2. The power shift transmission according to claim 1, wherein the two shifting devices are separate components and are at least one of controllable and regulatable.

3. The power shift transmission according to claim 1, further comprising a clutch, wherein the two shifting devices includes:

a first shifting device that directly shifts a first planetary gear set of the at least two planetary gear sets; and a second shifting device that indirectly shifts, via the clutch, the first planetary gear set and/or a second planetary gear set of the at least two planetary gear sets.

4. The power shift transmission according to claim 1, wherein:

the drive includes a drive shaft for introducing the torque introduced on a drive side on which a hollow output shaft forming the output is mounted in a rotatably adjustable manner;

the drive shaft having a main extension direction and defining, in the main extension direction, a centre longitudinal axis; and the at least two planetary gear sets are:

arranged axially in series with respect to the centre longitudinal axis such that one planetary gear set of the at least two planetary gear sets is arranged on the drive side and the other planetary gear set of the at least two planetary gear sets is arranged on an output side;

arranged coaxially with respect to the centre longitudinal axis; and/or directly and/or indirectly mounted on the drive shaft and/or the hollow output shaft in a rotatably adjustable manner.

5. The power shift transmission according to claim 4, wherein:

a drive-side planetary gear set of the at least two planetary gear sets is coupled to the drive shaft and includes at least one central sun gear, a planet gear stage, and a ring gear;

the ring gear is assigned a freewheel;

the ring gear is coupled via the freewheel to the drive shaft dependent on a direction of rotation; and the drive-side planetary gear set is formed by:

a simple planetary gear; or a reduced planetary gear including two central sun gears.

6. The power shift transmission according to claim 4, wherein an output-side planetary gear set of the at least two planetary gear sets is coupled to the hollow output shaft and is formed by:

a simple planetary gear including a central sun gear, a planet gear stage, and a ring gear; or a double planetary gear including two simple planet gears coupled to one another.

7. The power shift transmission according to claim 1, wherein the two shifting devices, with respect to the transmission device, are separate components.

8. The power shift transmission according to claim 1, wherein:

the two shifting devices each include a load gear wheel, an actuatable multiple-disc braking device for braking and/or fixing the load gear wheel, and a freewheel device for coupling the load gear wheel dependent on a direction of rotation; and/or the two shifting devices are arranged on a transmission housing and/or fixed in place at least with respect to the transmission housing.

9. The power shift transmission according to claim 8, wherein:

the load gear wheel of a first shifting device of the two shifting devices meshes with an external toothing of a first planetary gear set of the at least two planetary gear sets;

the external toothing is arranged on a ring gear of the first planetary gear set, the first planetary gear set arranged on a drive side and formed by a simple planetary gear or a reduced planetary gear; and/or the ring gear is positively fixable via the first shifting device and/or at least fixed in a single set transmission ratio of the transmission device.

10. The power shift transmission according to claim 8, further comprising a clutch, wherein:

the load gear wheel of a shifting device of the two shifting devices meshes with a driver gear wheel of the clutch; and/or the driver gear wheel, via the shifting device, is (i) fixed in an axial position viewed with respect to a centre longitudinal axis of a drive shaft of the drive and positively fixable on a circumferential side with respect to the centre longitudinal axis and/or (ii) fixed at least in a single set transmission ratio of the transmission device.

11. The power shift transmission according to claim 1, further comprising a clutch, wherein one shifting device of the two shifting devices interacts directly with the transmission device and the other shifting device of the two shifting devices interacts indirectly with the transmission device via the clutch, and wherein:

the clutch includes a driver gear wheel and two actuatable claw ring discs arranged in a non-rotatable and longitudinally moveable manner on opposite sides of the driver gear wheel such that a torque introduced on the two claw ring discs is transmittable to the driver gear wheel and/or another torque introduced on the driver gear wheel is transmittable to the two claw ring discs;

the clutch is arranged axially with respect to a centre longitudinal axis extending between the at least two planetary gear sets; and/or the clutch is mounted in a rotatably adjustable manner via a sun gear of an output-side planetary gear set of the at least two planetary gear sets on an output-side planetary gear set.

12. The power shift transmission according to claim 11, wherein:

a first claw ring disc of the two claw ring discs facing a drive-side planetary gear set of the at least two planetary gear sets is moveable back and forth between a disengaged coupling position, in which the first claw ring disc touchingly and without slip lies against a planet gear stage of the drive-side planetary gear set, and an engaged basic position disposed spaced apart longitudinally in this respect, in which the first claw ring disc is contact-free and disposed spaced apart relative to the planet gear stage of the drive-side planetary gear set and touchingly and without slip lies against a sun gear of the drive-side planetary gear set; and/or a second claw ring disc of the two claw ring discs facing the output-side planetary gear set is moveable back and forth between a disengaged coupling position, in which the second claw ring disc touchingly and without slip lies against a ring gear of the output-side planetary gear set, and an engaged basic position disposed longitudinally spaced apart in this regard, in which the second claw ring disc is contact-free and disposed spaced apart relative to the ring gear of the output-side planetary gear set and touchingly and without slip lies against the sun gear of the output-side planetary gear set.

13. A method for operating a power shift transmission for a vehicle driveable by motor power and/or pedal power, the power shift transmission including a transmission device which transmits a torque introducible on a drive in a transmission ratio settable via a plurality of gears to an output, and two shifting devices via which the transmission device is shiftable for setting the transmission ratio of the transmission device, the method comprising:

providing the power shift transmission in and/or with an initially pre-set transmission ratio of the transmission device;

setting the transmission ratio of the transmission device to a transmission ratio differing from the initially pre-set transmission ratio via the two shifting devices; and wherein the method further comprises:

actuating a first shifting device of the two shifting devices to directly fix and/or release a ring gear of a drive-side planetary gear set of the power shift transmission; and/or actuating a second shifting device of the two shifting devices to (i) fix and/or release a sun gear of the drive-side planetary gear set indirectly via a clutch, (ii) fix and/or release a sun gear of an output-side planetary gear set of the power shift transmission, and/or (iii) fix and/or release a ring gear of the output-side planetary gear set.

14. A bicycle, comprising a drive train including at least one power shift transmission according to claim 1.

15. The power shift transmission according to claim 1, further comprising a clutch, wherein:

the at least two planetary gear sets includes a drive-side planetary gear set and an output-side planetary gear set;

the clutch includes:

a driver gear wheel;

two actuatable claw ring discs arranged in a non-rotatable and longitudinally moveable manner on opposite sides of the driver gear wheel; and a resetting device for actuating the two claw ring discs;

the two claw ring discs includes (i) a first claw ring disc facing the drive-side planetary gear set and (ii) a second claw ring disc facing the output-side planetary gear set;

the first claw ring disc is moveable back and forth between (i) a disengaged coupling position, in which the first claw ring disc touchingly and without slip lies against a planet gear stage of the drive-side planetary gear set, and (ii) an engaged basic position, in which the first claw ring disc is contact-free and disposed spaced apart relative to the planet gear stage of the drive-side planetary gear set and touchingly and without slip lies against a sun gear of the drive-side planetary gear set; and the second claw ring disc is moveable back and forth between (i) a disengaged coupling position, in which the second claw ring disc touchingly and without slip lies against a ring gear of the output-side planetary gear set, and (ii) an engaged basic position, in which the second claw ring disc is contact-free and disposed spaced apart relative to the ring gear of the output-side planetary gear set and touchingly and without slip lies against a sun gear of the output-side planetary gear set.

16. The power shift transmission according to claim 15, wherein the resetting device is a shifting fork.

17. A power shift transmission for a vehicle driveable by motor power and/or pedal power, comprising:

a transmission device which transmits a torque introducible on a drive in a transmission ratio settable via a plurality of gears to an output; and two shifting devices via which the transmission device is shiftable for setting the transmission ratio of the transmission device;

wherein the two shifting devices each include:

a load gear wheel;

an actuatable multiple-disc braking device for braking and/or fixing the load gear wheel; and a freewheel device for coupling the load gear wheel dependent on a direction of rotation.

18. The power shift transmission according to claim 17, wherein:

the transmission device includes four planetary gear sets; and the four planetary gear sets are:

each configured as a simple planetary gear set;

arranged with respect to a centre longitudinal axis coaxially and in series; and/or completely engage all around the drive, which is a drive shaft having a main extension direction and defining, in the main extension direction, the centre longitudinal axis.

19. The power shift transmission according to claim 18, wherein the four planetary gear sets includes a first planetary gear set, a second planetary gear set, a third planetary gear set, and a fourth planetary gear set, and wherein:

axially with respect to the centre longitudinal axis, between the first planetary gear set and the second planetary gear set axially directly adjacent in this regard, a clutch is arranged, the clutch including three separately actuatable shifting elements, a clutch freewheel, and an annular clutch part, the clutch configured to connect the first planetary gear set to the remaining planetary gear sets of the four planetary gear sets;

a first shifting device of the two shifting devices is directly connectable to the clutch part of the clutch; and/or a second shifting device of the two shifting devices is directly connectable to a planet gear stage of the fourth planetary gear set and indirectly connectable to the output via a freewheel.

20. The power shift transmission according to claim 17, wherein the transmission device includes three planetary gear sets; wherein the three planetary gear sets are: arranged with respect to a centre longitudinal axis coaxially and in series and completely engage all around the drive, which is a drive shaft having a main extension direction and defining, in the main extension direction, the centre longitudinal axis; and wherein:

axially with respect to the centre longitudinal axis between a first planetary gear set of the three planetary gear sets and a second planetary gear set of the three planetary gear sets axially directly adjacent in this regard, a clutch is arranged, the clutch including two separately actuatable shifting elements and an annular clutch part;

a first shifting device of the two shifting devices is connectable directly to a plurality of planet gears of the second planetary gear set and, via a freewheel, to a central hollow shaft; and/or a second shifting device of the two shifting devices is connectable to a ring gear of a third planetary gear set of the three planetary gear sets and, via a further freewheel, to the central hollow shaft.

\* \* \* \* \*